Sept. 22, 1925.                    1,554,872
J. E. MEYER
VEHICLE SEAT
Filed April 5, 1923      2 Sheets-Sheet 1
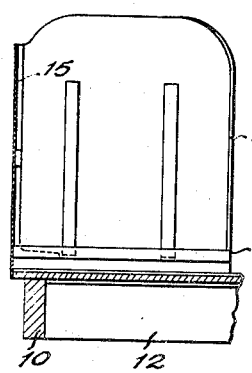
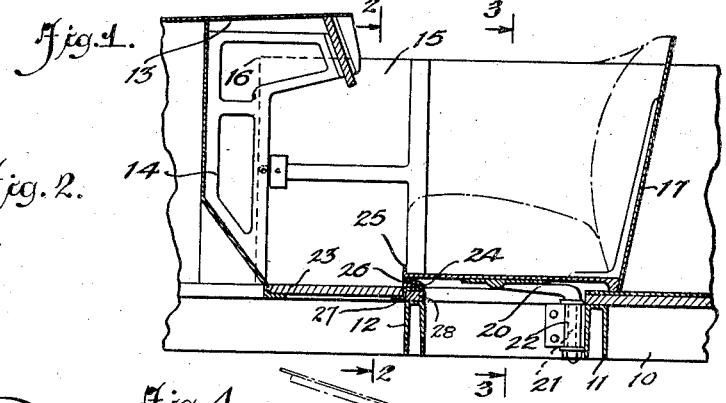
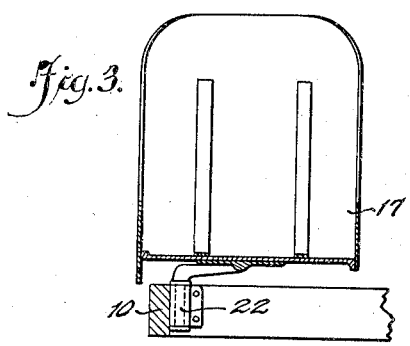
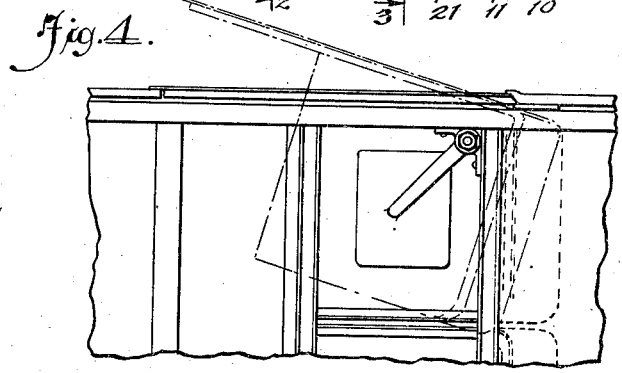
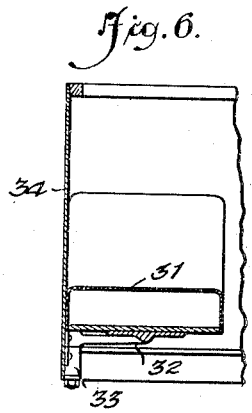
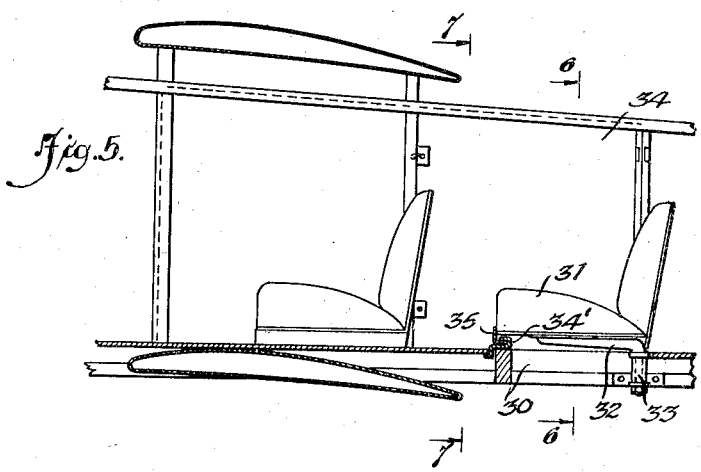
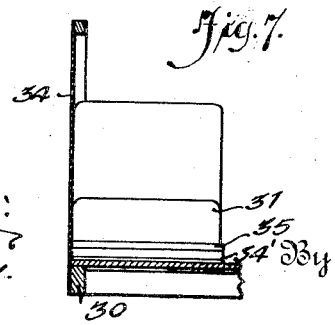
Witnesses
Inventor
JOHN E. MEYER
Attorney Sept. 22, 1925.
J. E. MEYER
1,554,872
VEHICLE SEAT
Filed April 5, 1923
2 Sheets-Sheet 2
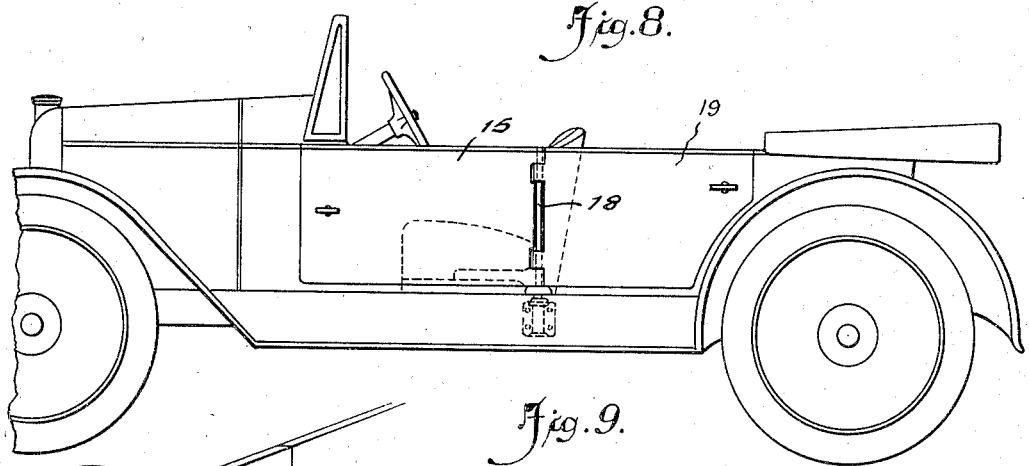
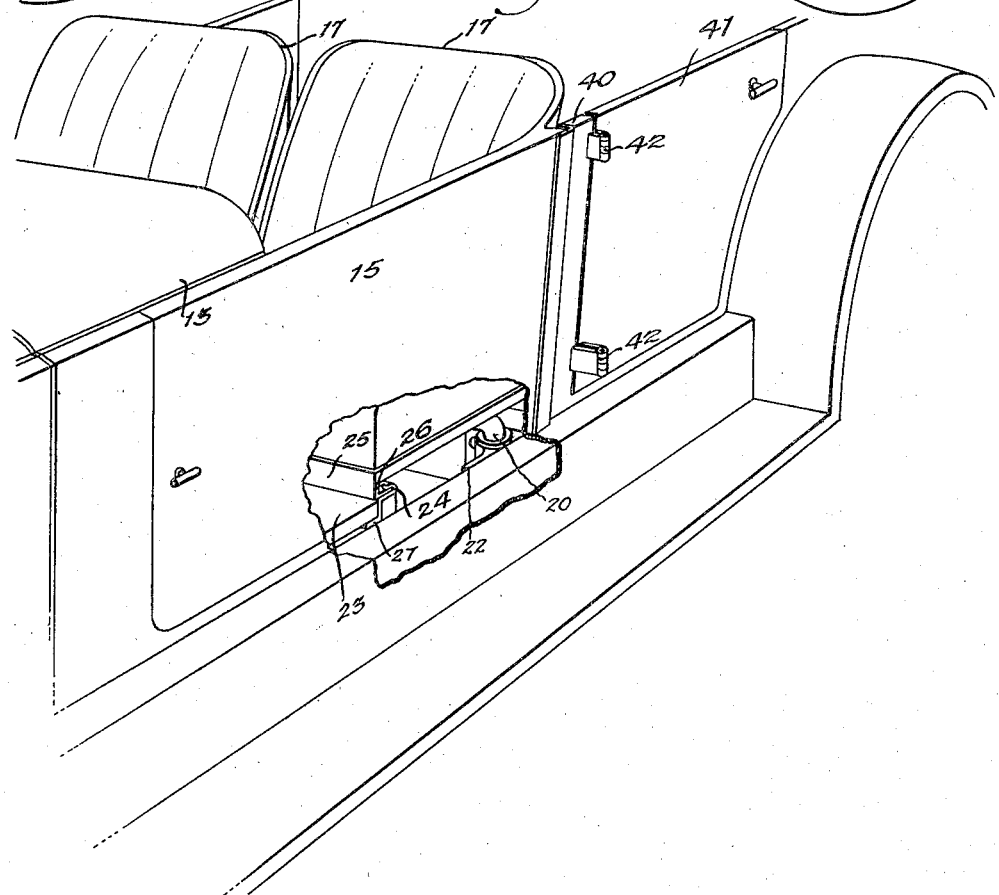

Patented Sept. 22, 1925.

1,554,872

UNITED STATES PATENT OFFICE.

JOHN ERNEST MEYER, OF NEW YORK, N. Y.

VEHICLE SEAT.

Application filed April 5, 1923. Serial No. 630,114.

*To all whom it may concern:*

Be it known that I, JOHN ERNEST MEYER, a citizen of the Republic of Switzerland, and a resident of the city of New York, borough of Manhattan, in the county and State of New York, have invented a new and Improved Vehicle Seat, of which the following is a full, clear, and exact description.

The present invention relates to new and useful improvements in vehicles, such as automobiles, airplanes, and the like, and it pertains more particularly to a seat and body construction therefor.

It is one of the primary objects of the invention to construct the body of a vehicle in such a manner that a portion of the side walls thereof may swing outwardly of the body portion to provide means for gaining access to the interior of the body.

It is a further object of the invention to mount the seats, more particularly the front seats, in such a manner that as the swinging section of the side wall of the body is moved outwardly the seat will be carried therewith.

It is a still further object of the invention to mount the seat on the frame of the vehicle in such a manner that the swinging section of the side wall of the vehicle will not receive the strain incident to carrying the weight of the seat.

With the above and other objects in view, reference is had to the accompanying drawings, in which—

Figure 1 is a detailed longitudinal sectional view of a motor vehicle body constructed in accordance with the present invention;

Fig. 2 is a detail sectional view taken on the line 2—2 of Fig. 1;

Fig. 3 is a detail sectional view taken on the line 3—3 of Fig. 1;

Fig. 4 is a bottom plan view showing the seat and a section of the side wall in dotted position;

Fig. 5 is a longitudinal sectional view of a portion of an airplane fuselage showing the improved seat mounted therein;

Fig. 6 is a detailed sectional view taken on the line 6—6 of Fig. 5;

Fig. 7 is a detail sectional view taken on the line 7—7 of Fig. 5;

Fig. 8 is a view in side elevation of a motor vehicle, the body of which is a modified form of the invention;

Fig. 9 is a perspective view partly broken away of a motor vehicle constructed in accordance with one form of the invention.

Referring more particularly to the drawings, the reference character 10 designates one of the side frames of a motor vehicle chassis, and 11 and 12 designate transversely extending braces. The cowl 13 of the body is supported by means of a suitable brace 14.

The reference character 15 designates a movable section of the side of the body, and such section extends from a point designated by the reference character 16 and shown in dotted lines in Fig. 1, under the column to a point at the rear of each front seat, which seats are shown at 17. Each of the seats 17 is secured to its respective swinging section of the body, and as more clearly shown in Fig. 9, the swinging sections 15 together with the seat 17 are mounted on an arm 20 with its depending portion 21, the latter being pivotally mounted on a bracket 22 carried by the side frame 10 of the chassis in such a manner that the seats 17 are capable of pivotal movement when their respective sections 15 are moved about their pivotal points on the brackets 22.

The reference character 23 designates the front floor board of the driver's compartment of the vehicle. The rear edge of the floor board is supported by a substantially U-shaped horizontal member 24, having at its lower end a horizontal extension 27, which serves as a supporting member for the floor-board 23. The member 24 together with its extension 27 is rigidly fastened to intermediate member 28, which in turn is part of the transversely extending brace 12. The front edge of the seat is provided with an L-shaped member 25 adapted to be received within the U-shaped member 24 when the seat is in position within the body of the car.

In Figs. 5 to 7, the reference character 30 designates the side frames of an airplane fuselage and the rear seats designated by the reference character 31 are each mounted upon an arm 32, which arms are mounted in brackets, or the like, 33, carried by the side frames. In this form of the invention the fuselage is provided with a swinging section 34 to which the seat is secured in such a manner that as the swinging section is moved to open position, the seat will be moved outwardly of the fuselage. In this form of the invention the fuselage body carries a U-shaped member 34' with which a substantially L-shaped member 35 is adapted to engage, it being understood that such an L-shaped member 35 is carried by the front edge of each seat 31.

In that form of the invention shown in Fig. 9, each side of the body is formed with a stanchion 40. The swinging sections 15 of the body are in contacting relation with the forward end of the stanchion 40 and the rear doors of the vehicle shown at 41, are pivotally mounted by means of hinges 42, which in turn are carried in the stanchion 40.

The device operates in the following manner:

When it is desired to enter the driver's compartment of the vehicle, the swinging sections 15 are moved about their pivotal points to the outer position. With the parts in this position it is only necessary for the passengers to sit upon the seats and swing the sections 15 inwardly. By operating the seats in this manner it is possible for the passengers after they are seated, to move their feet to position within the vehicle, and thus enter the vehicle without standing, which is much more desirable than entering the vehicle in a stooped position, particularly when the top of the vehicle is in position.

This method of entering the driver's compartment is particularly convenient on the driver's side where ordinarily great inconvenience is encountered due to the relative position of the seat and steering wheel in vehicles as commonly constructed.

What is claimed is:

1. In a vehicle, a chassis, a body having its side provided with a movable section, a seat secured to the movable section, and means for pivotally mounting the section and seat on the chassis so as to swing outwardly, said means comprising an arm having one end pivotally mounted on the chassis and its other end secured to the under side of the seat.

2. In a vehicle, a chassis, a body having its side provided with a movable section, a forwardly facing seat secured to the movable section, means for pivotally mounting the section and seat on the chassis, and cooperating means on the forward end of the seat and the floor of the body for holding the seat and section in position.

3. In a vehicle, a frame, a body having movable side wall sections, a seat carried by each of said movable side wall sections and swinging therewith, means for pivotally mounting each of said seats on the frame of the vehicle, said means comprising an arm rigidly secured to the seat and pivotally mounted in a bracket rigidly carried by the said frame, and means for locking the seats in position.

4. The combination with a motor vehicle body and a swinging seat, of a substantially U-shaped member carried by the frame of the body, said U-shaped member forming a support for one of the floor boards of said body, and an angular member carried by the seat and adapted when the seat is in closed position to occupy a position within the U-shaped member, as and for the purpose set forth.

5. In a vehicle, a body formed with swinging side sections, a seat adapted to move with each of said swinging side sections, a substantially U-shaped metallic member carried by the frame of the vehicle, and an L-shaped member carried by said seat and adapted to be received within the U-shaped member, as and for the purpose set forth.

JOHN ERNEST MEYER.